April 18, 1939.   W. E. LAWRENCE   2,155,198
VARIABLE SPEED GEARING MECHANISM
Filed May 5, 1934   3 Sheets-Sheet 1

INVENTOR.
William E. Lawrence
BY
Pay, Oberlin & Pay
ATTORNEYS

April 18, 1939.  W. E. LAWRENCE  2,155,198

VARIABLE SPEED GEARING MECHANISM

Filed May 5, 1934  3 Sheets-Sheet 2

INVENTOR.
William E. Lawrence
BY
Bays, Oberlin & Bay
ATTORNEYS

INVENTOR.
William E. Lawrence
BY
Ray, O'Berlin & Ray
ATTORNEYS.

Patented Apr. 18, 1939

2,155,198

UNITED STATES PATENT OFFICE 2,155,198

VARIABLE SPEED GEARING MECHANISM

William E. Lawrence, Cleveland Heights, Ohio

Application May 5, 1934, Serial No. 724,077

33 Claims. (Cl. 74—293)

This invention relates to gearing, and more particularly variable gearing; and it is among the objects of the invention to provide mechanism having a range of convenient forward and reverse speeds. A further object is the provision of control means therefor which may be both automatically and volitionally actuated. Another object is the provision of moving parts capable of dynamic counterbalancing. Other objects and advantages may appear as the description proceeds.

To the accomplishment of the foregoing and related ends, the invention, then, comprises the features hereinafter fully described, and particularly pointed out in the claims, the following description and the annexed drawings setting forth in detail certain illustrative embodiments of the invention, these being indicative however, of but a few of the various ways in which the principle of the invention may be employed.

Figure 1:
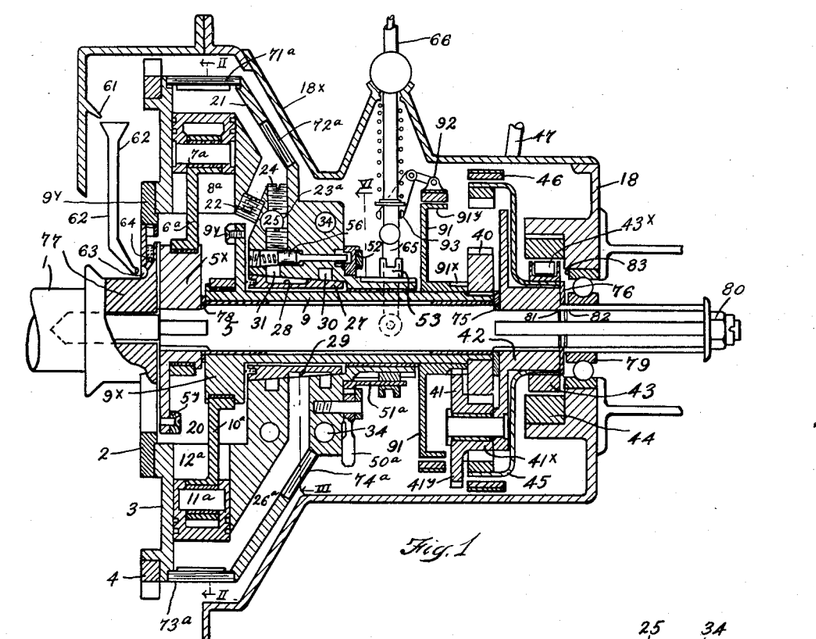
Fig. 1 is an axial sectional view of an embodiment of the invention.
Figure 2:
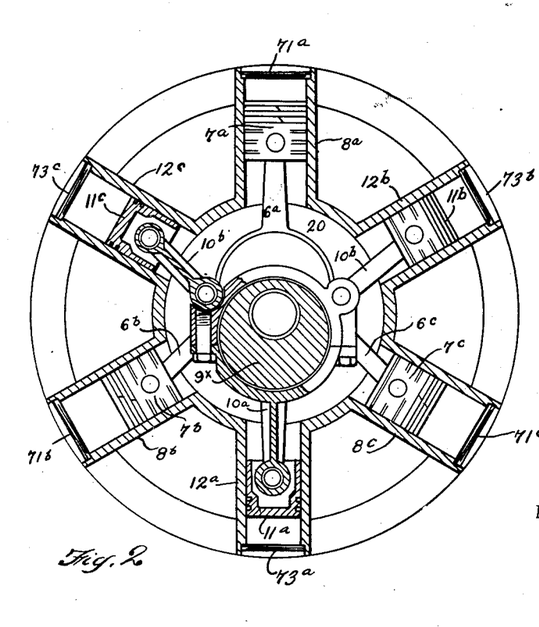
Fig. 2 is a transverse section taken on a plane substantially indicated by line II—II, Fig. 1.
Figures 3, 5, 6, 7:
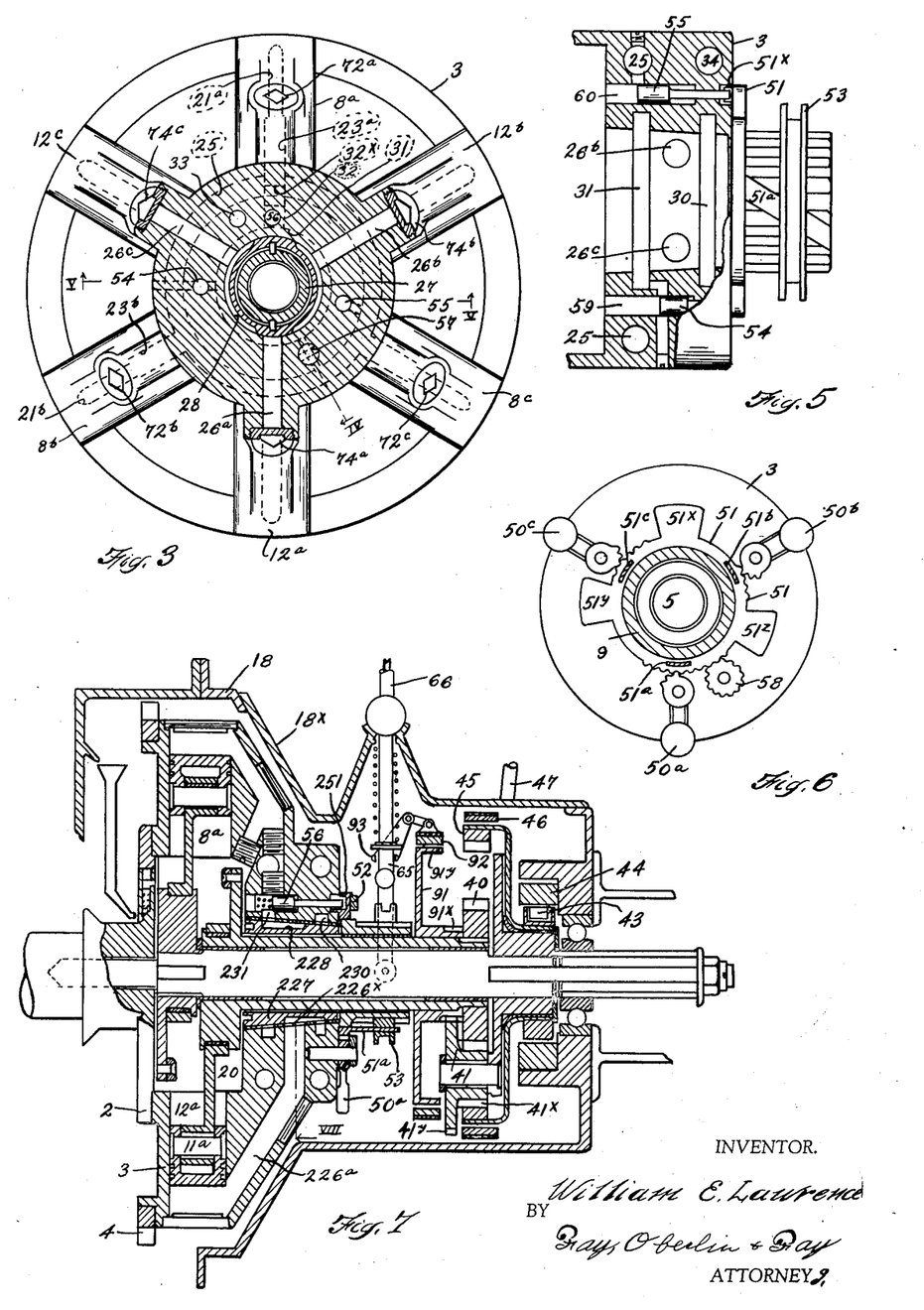
Fig. 3 is a transverse sectional view taken on a plane substantially indicated by line III—III, Fig. 1.
Fig. 5 is a similar view along the line V—V, Fig. 3, with the central shafts and valve removed.
Fig. 6 is a transverse sectional view taken on a plane substantially indicated by line VI—VI, Fig. 1.
Fig. 7 is a view similar to Fig. 1, showing modifications.

Referring more particularly to the drawings, there is shown (Fig. 1) a drive shaft 1, which for the purpose of discussion here may be illustratively taken as the shaft of an internal combustion engine, and an extension collar 2 may be secured thereto, carrying a fluid fly-wheel 3 on which may be secured a starter-gear 4. Within the fly-wheel 3, and having a suitable bearing as in the shaft 1 is a transmission shaft 5, to which is splined an eccentric 5x and a counterbalance 5y. The eccentric 5x actuates a master connecting rod 6a, Fig. 2, and secondary connecting rods 6b, 6c, thus reciprocating the pistons 7a, 7b, 7c, in the cylinders 8a, 8b, 8c. Concentrically exterior to the shaft 5 is a hollow shaft 9 having an eccentric 9x and its counterweight 9y. The eccentric 9x actuates a master connecting rod 10a, Fig. 2, and secondary connecting rods 10b, 10c, thus reciprocating pistons 11a, 11b, 11c in cylinders 12a, 12b, 12c, the pistons 11a, 11b, 11c having a displacement different from that of pistons 7a, 7b, 7c. By arranging three cylinders 8a, 8b, 8c, 120° apart, and the cylinders 12a, 12b, 12c, therebetween and at equal angular spacing, all cylinders are 60° apart, and by means of offset connecting rods, as indicated in Fig. 1, all may lie substantially in a common plane, constituting the fly-wheel and the cylinders being a part thereof. Within the fly-wheel 3 is a central sump 20, from which conduits lead to the cylinders, with ports for return of fluid to the sump after circulation. Conduit 21, Fig. 1, leads from cylinder 8a to a branching Y, with intake branch through an automatic check valve 22 to the sump 20, and an exhaust branch through the automatic check valve 24 to the exhaust conduit 23a, which empties into the pressure conduit 25, which is an annular conduit cored into the hub of the fly-wheel 3. By similar conduits and check valves, as shown in Fig. 3, the cylinders 8a, 8b, 8c, similarly intake from the sump and exhaust into the same annular pressure conduits 25, the direction of flow being controlled by the check valve. From the cylinder 12a, a conduit 26a is gauged to a central master timing valve 27, having two valve openings or ports, the port 28 leading to the drive conduit 31, and the valve port 29 leading to the release conduit 30. The timing valve 27 is secured to the hollow shaft 9 so as to at all times be in harmonious actuation with the eccentric 9x which operates the pistons 11a, 11b, 11c. The valve 27 is provided with a clearance from the shaft 9 and from the exterior key surface, so that the shaft 9 transmits tangential thrust, but no radial thrust upon the valve 27. The valve 27 is held to its seating against fly-wheel 3 by a coil spring supported by the eccentric 9x.

As further seen in Fig. 3, the cylinder 12b has a conduit 26b, and the cylinder 12c a conduit 26c, both conduits (like conduit 26a) leading to the timing valve 27. Thus, as the timing valve rotates in step with the eccentric 9x, the conduits or ports 26a, 26b, 26c are successively brought to face the valve port 28 leading to the drive conduit 31, thereby admitting fluid into the appropriate cylinder, and then on to connect with valve port 29, thereby releasing fluid from the cylinder to the release port 30. In such manner, with appropriate timing, fluid is alternately admitted to and then released from a given cylinder, with succession of drive and release to another cylinder, to cause rotation of the hollow shaft 9, and by using a multiple number of cylinders, the flow of power is continuous, and pulsations are avoided.

Figure 4:
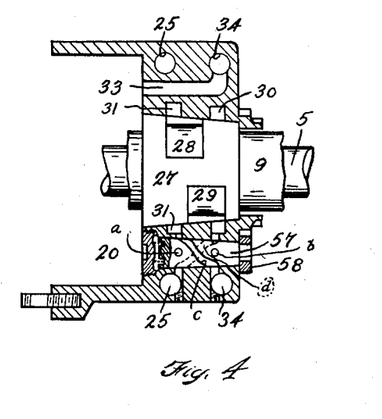
Fig. 4 is a fragmentary axial view taken on a plane substantially indicated by line IV—IV, Fig. 3.

The pressure conduit 25 is connected to the drive conduit 31 by a conduit 32 in which is placed an automatic check valve 32x, such that fluid may pass from the pressure conduit 25 to the drive conduit 31, but not in reverse direction from 31 to 25. An annular exhaust conduit 34 is connected by an exhaust port 33, Figs. 3 and 4, leading to the sump 20, as will be referred to again hereinafter. Splined to the hollow shaft 9 is a gear 40, which is the sun gear of a planetary train. The planetary pinions 41 are each double, having gear teeth 41x meshing with the sun gear 40 and the ring gear 45, and another set of gear teeth 41y meshing centrally with the tooth portion of a disk 91 having an outer drum surface 91y. Desirably, there are three idler gears 41 having their tooth portions 41y in mesh with the tooth portion 91x of the disk 91. The outer drum 91y is capable of being engaged to a standstill or locked, by a brake band 92 operated by suitable means, as by a forked arm 93 engaging the lever 65, to release or cam-spread the brake band or retarding band, as desired. The planetary cage 42 is secured to shaft 5, and carries the idler pinions 41. By virtue of supporting the idlers 41 at both ends, misalignment and noisy operation is also obviated. Free on the hub of the cage 42 is a ring gear 45, whose hub is provided with a one-way clutch 43, having exterior roller ratchets 43x engaging the ring 44 which is splined to the transmission casing or housing 18. The ring gear 45 meshes with the pinions 41x. The stationary ring 14 is thus seen to serve as a stationary reaction member in reduced ratio, by holding the ring gear 45 to a standstill against a reverse thrust, but releasing it automatically in high ratio when under forward thrust. Additionally, the ring gear 45 is also provided with a grab band or brake band 46, operated by a reverse lever 47, and thus when desired, the ring gear 45 may be held to a standstill by the grabband.

Mounted on the fly-wheel 3 are centrifugal weights 50a, 50b, 50c, Figs. 1 and 6, which are provided with segmental teeth meshing with a ring gear 51, which is free to have arcuate motion on the fly-wheel 3 as controlled by the governor weights 50a, 50b, 50c. The ring gear 51 is retained in its mounting by a retaining-ring 52 (removed in showing in Fig. 6). On the ring gear 51 are three sloping longitudinal facial cams 51a, 51b, 51c (Figs. 1, 5 and 6), which fit and pass through three openings in a slide collar 53 which is splined to the fly-wheel 3, so that the position of the ring gear 51 in its arc may be controlled by means which does not disturb dynamic balancing. The ring gear 51 also has three facial cams 51x, 51y, 51z, which in the arcuate movement of the ring gear close appropriate piston-control valves as follows: Valve 54, Fig. 5, is a low-clutch valve, closing the release port 59 so that fluid may not escape from the drive conduit 31 to the sump 20. Valve 55, Fig. 5, is an intermediate clutch control valve, so that fluid may not escape from the pressure conduit 25 to the sump, but must pass through the connecting conduit 32 to the drive conduit 31. Valve 56 is a high-clutch control valve, so that, valve 55 being closed, fluid may not escape from pressure conduit 25 either to the sump 20 or to the drive conduit 31 (Fig. 1).

In association with the ring gear 51 is also a four-way reversing valve 57 to be operated by the ring gear 51 through a pinion 58 secured on the valve stem (Figs. 4 and 6) The reverse valve 57 has four ports 57a, 57b, 57c, 57d. In forward drive position, the port 57a connects the annular conduit 25 to drive conduit 31, and port 57b connects conduit 30 to conduit 34, so that fluid from the pressure conduit 25 leads to conduit 31, driving the pistons so timed that the hollow shaft 9 runs ahead or faster than the fly-wheel 3, the fluid then releasing to conduit 30, thence passing to conduit 34 and returning to the sump 20 by conduit 33. In reverse drive position, conduit 25 is connected to conduit 30, and conduit 31 to conduit 34, so that fluid from conduit 25 driving in upon conduit 30 reverses the direction of rotation of hollow shaft 9, conduit 31 becoming a release conduit to permit return of the fluid to the sump by way of conduits 34 and 33.

An automatic fluid refill device is desirable, such as a ledge 61, Fig. 1, leading to a tube 62 which discharges to a groove 63 in the motor shaft so that any fluid in the casing 18 and any splashed against the top may be collected by the ledge 61 and discharged into the groove 63, from whence by centrifugal force it is drawn back through the connecting opening into the sump 20. A check valve 64 prevents draining while standing.

For manual control of the valves, a slide-collar 53 is arranged to be operated by lever 66 supported on a detachable cover plate 18x bolted to the casing 18. Desirably, the fly-wheel and cylinder assembly is arranged with its fluidways or bores such as to be externally closeable by plugs 71a, 71b, 71c, 72a, 72b, 72c, 73a, 73b, 73c, 74a, 74b, 74c. All conduits, ports and valve openings, may thus be provided by drilling and plugging, except the annular conduits.

To take thrust in the planetary train, retaining washers 75 and 76 are desirably provided, and thrust may be taken within the fly-wheel 3 by bushings 77 and 78. Thrust is also taken by the transmission main bearing 79.

The speedometer connection gear and universal joint may be splined to the transmission shaft 5 by a lock nut 80, and a snap ring 81 may secure the planetary cage 42 which is splined to the transmission shaft 5, while snap rings 82 and 83 may retain the transmission bearing 79 which is also retained by the housing of the universal joint.

From the foregoing construction, it will be readily understood that in operation, assuming the motor shaft 1 and flywheel 3 to be in rotation, the transmission shaft 5 will be constrained toward standstill by the weight of the vehicle or load to which it is connected. As the fly-wheel rotates around the transmission shaft 5 and its eccentric 5x, the pistons 7a, 7b, 7c will be caused to reciprocate in their cylinders 8a, 8b, 8c. This causes fluid to be withdrawn from the sump 20 and under control of the check valves 22 and 24, be emptied jointly into all three cylinders from the annular pressure-conduit 25. If the clutch port control valves are open, no power is transmitted. Rotation of the fly-wheel 3 also causes reciprocation of the pistons 11a, 11b, 11c, thereby intaking and exhausting by the conduits 26a, 26b, 26c, with no power transmission while the clutch port 59 (Fig. 5) or control valve is open. Intake is permitted through conduits 33, 34 and 30, and exhaust through port 59.

As the motor speed accelerates, the governor weights 50a, 50b, 50c move outwardly, and the ring gear 51 is correspondingly slightly turned arcuately so that the facial cam 51y, (Fig. 6), closes the low-clutch control valve 54, Fig. 5. By this means, fluid from the cylinders 12a, 12b, 12c is prevented from escaping to the sump, thereby engaging hollow shaft 9 as attached to the flywheel. This causes the sun gear 40, running clutched to the fly-wheel 3, to exert a reverse thrust of the pinions 41, upon ring gear 45, which is thereby held to standstill by the one-way roller ratchet clutch 43. The ring gear being held to standstill, the planetary cage 42, and with it the transmission shaft 5 to which it is splined, follow the sun gear with a multiplication of torque as determined by the gear train, suitable for first speed.

With a still further acceleration of speed, and a correspondingly further arc motion of the ring gear 51, valve 55 (Fig. 5) is brought to closure by the facial cam 51z (Fig. 6). By this means, the transmission is brought to intermediate ratio, closure of valve 55 preventing escape of fluid through port 60 (Fig. 5), so that the fluid from conduit 25 which contains the united exhaust from cylinders 8a, 8b, 8c, drives through the check valve 32x and conduit 32 into the annular drive conduit 31; thereby as described above, the pistons 11a, 11b, 11c impel the hollow shaft 9 to rotation faster than the fly-wheel 3. Thus, although the gear ratio of the planetary train is not changed, the ratio of the motor shaft 1 to the transmission shaft 5 is altered proportionately to the rotation of hollow shaft 9 and sun gear 40 faster than the fly-wheel 3. By reason of the selected ratio of the cylinders, this causes an intermediate ratio suitable for second speed, as will be referred to again hereinafter.

With still further acceleration, and corresponding further arc movement of the ring gear 51, the facial cam 51x closes the valve 56, Fig. 1, and prevents escape of fluid from the annular pressure conduit 25. Thus the reciprocation of pistons 7a, 7b, 7c is prevented, and the transmission shaft 5 is clutched to the fly-wheel 3 in high gear or 1 to 1 ratio suitable for third speed. In this third ratio, both sun gear 40 and cage 42 are carried into forward rotation, so that forward thrust is exerted upon the ring gear 45. An above-mentioned, the roller ratchet 43 is thereby released, allowing the planetary train to revoive as a unit in the forward direction, and making possible a cessation of reciprocation of both sets of pistons, 7a, 7b, 7c, and 11a, 11b, 11c, so that the entire transmission revolves in high ratio without reciprocation of gear drive or other internal motion. After the transmission has attained third speed for 1 to 1 ratio, on a still further acceleration of the drive, a fourth speed is attained on the basis of an over-drive, whereby the transmission shaft 5 is driven faster than the fly-wheel 3. This is not to be confused with the over-drive of the sun gear in second speed, whereby the sun-gear is driven faster than the fly-wheel. In such fourth speed, the centrifugal governor weights 50a, 50b, 50c fly out to their fullest extent, further moving the ring gear and thrusting the sliding collar 53 furtherest to the rear, or right in Fig. 1. Thereby, the lever 65 moves the forked arm 93 to engage the brakeband 92 and cause the drum 91y to be held to standstill. The ring gear 45 being still carried into forward motion is released by the ratchets 43x and forms no part of the drive. The drive is through sun gear 40, pinions 41x, 41y, and the central gear 91y which is now held stationary. Under these conditions the pinions 41 will move with them the cage 42 and transmission shaft 5, travelling forward in planetary motion equal to the sun gear plus an additional rotation required by the forward axial rotation of the pinions 41y meshed with the stationary central gear 91x. At the same time that the fourth speed engagement occurs, the governor has moved the ring 51 such as to control the valves to clutch pistons 11a, 11b, 11c, and with them the sun gear 40, by a valve closure to the fly-wheel 3, and the pistons 7a, 7b, 7c may be de-clutched, by allowing the valve 56 to open again. Thereby the driven shaft 5 is de-clutched and allowed to rotate faster than the fly-wheel.

If while in fourth speed, the lever 65 be depressed slightly so as to set up valve pressure through the lever 65 but not sufficient to release the brake band 92, a fluid-braking action may be obtained.

For reverse, the grab band 46 is manipulated by the reverse lever to hold the ring gear 45 to a standstill, irrespective of the roller ratchet 43. The reverse valve 57 is then turned into position shown in Fig. 4, causing, as noted above, a reverse flow through the timing valve 27, so that the pistons 11a, 11b, 11c drive the hollow shaft 9 and sun gear 40 in reverse direction. Since the sun gear is now running away from the flywheel 3 instead of ahead of it, the ratio of piston differential produces a torque ratio suitable for reverse.

Provision is made for the operator to exert volitional control at any time, irrespective of the governor, and by manually moving the lever 66, the fork 65 slides the collar 53 longitudinally, which then produces an arc movement of the ring gear 51 by means of the slanting facial cams 51a, 51b, 51c. This motion is necessary to turn the reversing plug-valve 57 into reverse position. It may be used optionally in order to advance or retard the ratio, contrary to the natural action of the governor 50a, 50b, 50c. In order to gain a motor-braking effect, such as a low or intermediate in hill descent, the lever 47 may be operated to hold the ring gear 45 to a standstill, and the sliding collar 53 is moved by its lever 66 to the appropriate position. Further volitional control over the change of ratios, but without resort to the lever 65, is provided by the construction of the clutch control valve 56. It will readily be seen that the valve closes against the pressure of the fluid, direct outlet to the sump being blocked. By this means, being in reduced ratio under heavy load, change to higher ratio is retarded, the fluid pressure operating to retard the governor 50a, 50b, 50c. But if the operator desires prematurely to advance to higher ratio, he may momentarily release the accelerator, removing the fluid pressure so that the valve 56 closes entirely, passing by the port 32, and thus advancing to a higher ratio at will.

The ratios suitable for the respective speeds may be made comparable to usual practice. For example: In the first speed, the transmission has the natural ratio of the selected gear train, so that if the ratio of sun gear 40 to pinion 41x be 5 to 2, the torque is 2.8. In the second speed, the sun gear 40 is over-driven at a rate determined by the fixed inequalities of piston displacement, and if this piston differential be approximately 3 to 2, or for instance more precisely 28 to 19, the torque is about 1.7. In reverse, the same piston differential gives rise to a different ratio because the pumping members are running away rather than with the fly-wheel, and the displaced fluid volume is changed, so that the torque would be about 2.8. In third speed, the torque is 1. In fourth speed, the driven shaft revolves with the fly-wheel plus an amount equal to the forward axial rotation of the pinion 41x, so that, provided a planetary of 2.8 be used, if the ratio of central gear 91x to pinion 41y be 3 to 4, the torque will be about 0.7.

By such means, four speeds forward and one reverse are available, with automatic ratio change, conforming to customary ratio requirements.

Figures 8, 10:
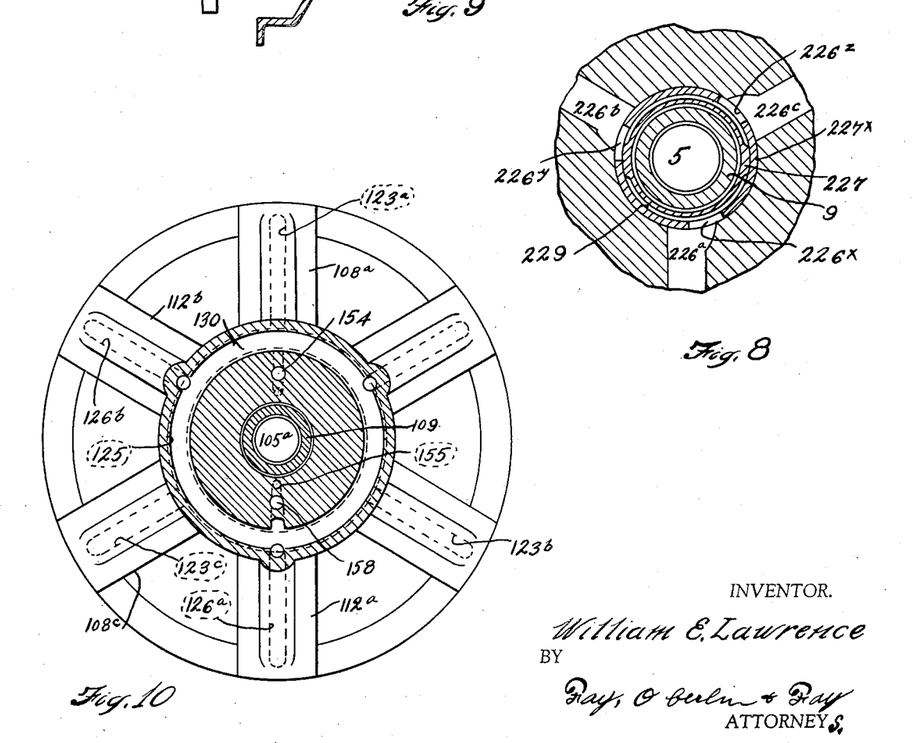
Fig. 8 is a transverse sectional view thereof taken on a plane substantially indicated by line VIII—VIII, Fig. 7.
Fig. 10 is a transverse sectional view thereof taken on a plane substantially indicated by the line X—X, Fig. 9.

Instead of having a fixed intermediate ratio, in some instances it is desirable to have a variable intermediate ratio, and such a modification is shown in Figs. 7 and 8, with means which does not disturb dynamic counterbalance. The general construction resembles that shown in Fig. 1, except that instead of a timing sleeve-valve 27, there is a device for timing the recirculating fluid in second and reverse speeds, consisting of two members, a timing sleeve-valve 227, similar to the above-described valve 27, and a movable valve seat or sleeve 227x. The latter is a shell tapered to fit over the valve member 227 and on its outer surface to fit within the hub of the fly-wheel. It has openings 231x and 230x admitting fluid into or out of conduits 231 and 230 at all times. It has also three openings 226x, 226y, 226z, which face, as in Fig. 8, the cylinder ports 226a, 226b, 226c, respectively. By a lug 251d, the movable seat 227x is engaged by the arcuate movable ring 251.

By this means, as particularly shown in Fig. 8, the inlet and outlet timing of valve 227 may remain in fixed relation to the reciprocating pistons, but the valve seat 227x may be retarded by the action of the ring 251, manually or governor-actuated. When thus retarded, driven fluid may not enter from the drive conduit 231 and valve port 228 into the cylinder port 226b by the valve opening 226y until the piston has descended part of its stroke, and can thereby accommodate fluid only in the remainder of its stroke. As the valve seat 227x is further retarded (turned counter-clockwise in Fig. 8) the inlet of fluid is further delayed. Correspondingly, a retardation of valve port 226x delays fluid entering the cylinder port 226a, and the same for 226b, and 226c, as rotation of the valve 227 permits successive timing in driving of fluid. It will be readily seen that by this retardation, a given cylinder, such as 12a, is connected to the inlet port during only a part of the inward stroke, reducing its fluid-acceptance capacity; and also during an initial portion of the outward stroke, still further reducing the stroke-capacity, since during this interval fluid is driven back again into the pressure conduit. In order to avoid any vacuum-tendency, the driven pistons may be provided with intake check-valves.

By this means, the arcuate motion of the valve seat 227x, which does not disturb dynamic counterbalance, may be used to vary the cylinder-capacity of the driven set, speeding up the overdrive of the sun gear 40, and thereby varying the torque in second speed.

Figure 9:
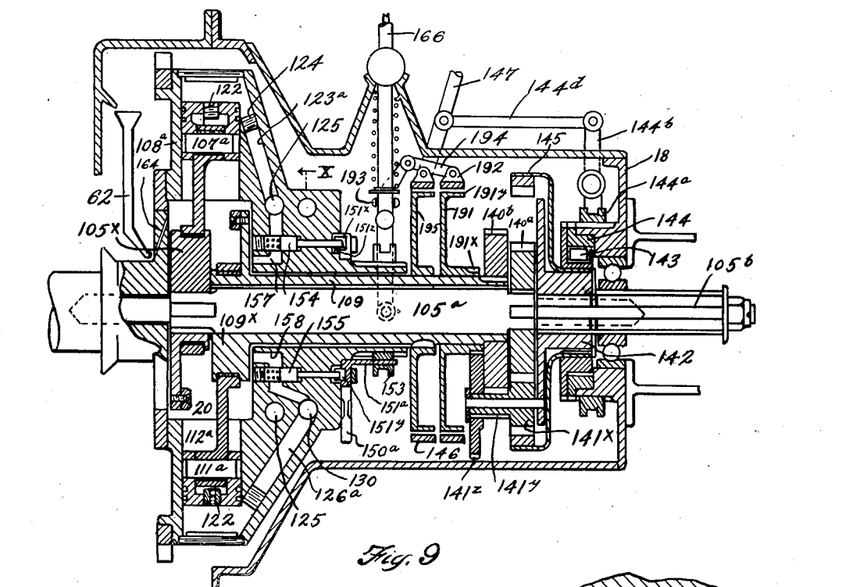
Fig. 9 is an axial sectional view similar to Fig. 1, showing modification.

As a further refinement, I may provide for four forward speeds and one reverse, simplifying the fluid elements somewhat and increasing the mechanical gear means. In such device, the master timing valve 27 is eliminated, together with all fluid-recirculating drive. The general arrangement may be as described foregoing, including the motor shaft, fly-wheel, and starter gear, etc. The transmission shaft 105a has a bearing in a driven shaft 105b capable of independent movement. An eccentric 105x on shaft 105a drives three pistons 107a, 107b, 107c, in cylinders 108a, 108b, 108c. A concentric hollow shaft 109 has an eccentric 109x reciprocating three pistons 111a, 111b, 111c in three cylinders 112a, 112b, 112c. The cylinders are spaced apart 60°, in a common plane, but are not required to be of differential capacity. The piston sets 107a, 107b, 107c is arranged to intake from the central sump through check valves 122 which may be placed in the piston heads, and exhaust is had by way of the ports 123a, 123b, 123c, with check valves 124, all emptying into the annular conduit 125. By a similar action, the pistons 111a, 111b, 111c intake through check valves 122 and exhaust through check valves 124, and the ports 126a, 126b, 126c jointly into the annular conduit 130.

Splined to the transmission shaft 105a is a sun gear 140a, part of the planetary train, and splined to the driven shaft 105b is a cage carrying three pinions 141. Each of these pinions has a triple gear with respect to the teeth sections 141x, 141y, 141z, integral or splined into the one unit. The pinion gear 141x meshes with the sun gear 140a and with the ring gear 145. The ring gear 145 is held against reverse travel and is released to forward travel by a one-way ratchet 143 engaging a ring 144, which may be engaged to or released from the casing 18 by a sliding collar 144a operated by a lever 144b. A link 144d connects the lever 144b to the reverse lever 147.

Splined to the hollow shaft 109 is a sun gear 140b, larger than the sun gear 140a, meshing with the three pinion gears 141y, which are smaller than the pinion gears 141x. Three governor weights 150a, 150b, 150c mesh by arcuate teeth sections with a ring 151 having longitudinal cams 151a, 151b, 151c engaging a sliding collar 153 which is controlled by a fork operated by a lever 166, whereby the arc motion of the ring 151 may be controlled by means which does not disturb dynamic balance. The ring 151 has three facial cams 151x, 151y, 151z capable of closing valves as the ring 151 is moved through an arc.

The annular conduit 125 has a release port 157 returning fluid to the central sump 20, and being capable of closure by the low-clutch valve 154. The annular conduit 130 has a release port 158 capable of being closed by the intermediate clutch valve 155. Valve 154 may be closed by the successive action of cams 151x and 151z, and the valve 155 by the cam 151y. These cams are located on the face of the ring 151, so that as the latter moves through an arc, the valve 154 is first closed by its cam 151x, next it is opened again, and the valve 155 is closed by the cam 151y; then the valve 155 being still closed, valve 154 is closed by the cam 151z; finally, the valve 154 being still closed, valve 155 is allowed to open again.

Free on the hollow shaft 109 is a disk 191 having a central set of gear teeth 191x which mesh with the pinion gears 141z of the triple pinions 141; also an outer drum 191y which may be engaged to a standstill by a brake band 192. The brake band is operated by a lever 194 moved by a forked arm 193 engaging the lever 166. Keyed to the hollow shaft 109 is a brake drum 195 which may be engaged to standstill by a brake band 196 operated by a suitable lever 147, which may be a part of the connected-up system 144d, etc.

Again, a return tube 62 may direct splashed fluid into a groove 63 in the motor shaft, whence it may be led by centrifugal force through openings back into the sump. These openings may be calibrated openings 164 extending in outward radial direction to the sump, and be of a size to permit passage of fluid into the sump under centrifugal force, but small enough that when the motor is not running they can hold the fluid back by capillary attraction and prevent draining the sump while standing.

In the operation of this form of the mechanism, the piston set 107a, 107b, 107c forms a first speed means, as held by closure of the low-clutch valve 154 which prevents escape of fluid from those cylinders into the annular conduit 125 and sump, and the pistons 107a, 107b, 107c and transmission shaft 105a are in effect clutched to the fly-wheel. In similar manner, the pistons 111a, 111b 111c form a second speed unit, engaged by closure of the intermediate clutch valve 155, these pistons and the hollow shaft 109 in effect being clutched to the fly-wheel.

Either set independently, or both sets conjointly, may be in effect clutched to the fly-wheel by the arcuate motion of the ring 151 actuated by the governor 151a, 151b, 151c, whereby the appropriate facial cams 151x, 151y, 151z open and close the clutch valves 154 and 155, as desired in respective speeds. For instance: At slow motor speed or idling motor, both valves 154 and 155 are open, and there is no clutching action and no transmission of power. With acceleration of speed, the outward impulse of governor weights 150a, 150b, 150c moves the ring 151 through an arc so that facial cam 151x closes valve 154, thereby in effect holding the transmission shaft 105a to the fly-wheel. First speed drive is thereby obtained, the sun gear 140a being clutched to the fly-wheel 3. The ring gear 145 being held against reverse thrust by the ratchet 143, the drive is through the sun gear 140a, pinions 141x, cage 142, and stationary ring gear 145, so that the cage 142 follows the sun gear 140a at a slower pace, driving the driven shaft 105b with a torque suitable for first speed.

With further motor acceleration, further outward governor impulse moves the ring 151 so that the cam 151x passes beyond the valve stem 154 and allows that valve to open, de-clutching the sun gear 140a; and the cam 151y closes the valve 155, clutching the hollow shaft 109 as above-noted. This is second speed, the drive being through the sun gear 140b, pinions 141y, pinions 141x, and stationary ring gear 145, so that the cage 142 and with it the driven shaft 105b follow the sun gear 140b in forward drive. Since the pinions 141y are smaller than pinions 141x, the compound pinions 141 are speeded up in axial rotation, thereby over-driving the de-clutched sun gear 140a by a gear differential comparable to the action of the piston differential in the form shown in Fig. 1, and the cage 142 and driven shaft 105b are driven at a ratio suitable for second speed.

With further acceleration of the motor and further governor action on the ring 151, the valve 155 being still closed, the facial cam 151z closes valves 154, so that both piston sets are stalled against reciprocation, and shaft 105b and hollow shaft 109, together with sun gear 140a and sun gear 140b are clutched to the fly-wheel 3. Thereby the pinions 141 are incapable of axial rotation and therefore the cage 142 and driven shaft 105b are driven in 1 to 1 ratio suitable for third speed. The ring gear 145 is released by its forward rotation on ratchet 143 and the entire transmission revolves as a unit with the internal movement.

With still further acceleration of speed, the shaft 105a and sun gear 140a being still clutched to the fly-wheel by reason of closure of the valve 154, the cam 151y passes by valve 155 so that it may open again and de-clutch the hollow shaft 109 and sun gear 140a. At this point, similarly as in Fig. 1, the sliding collar having been positioned by the longitudinal cams 151a, 151b, 151c of the ring 151 to the furthest rear or right, and carrying with it the fork and lever 166, the forked arm 193 operates cam 194 to draw the brake band 192 and arrest the disk 191 to standstill. This is fourth speed, with a drive analogous to that of Fig. 1, through sun gear 140a, pinion gears 141x, 141z, and stationary central gear 191x, with an over-drive ratio suitable for fourth speed.

The reverse drive is obtained by a manual, that is, hand-lever or foot-pedal, movement carrying the sliding collar 153 to the extreme forward or left, so that both clutch valves 154 and 155 are open, de-clutching shafts 105a and 109. The lever 147 is then positioned to the extreme forward or left, so that brake band 146 is drawn to arrest drum 195 and with it the hollow shaft 109 and sun gear 140b to standstill. Simultaneously, the link 144d draws a lever 144b forward, to thrust the sliding collar 144a to the rear or right. The ring 144 is by this means disengaged from the casing 18, so that when clutched by the ratchets 143 it does not arrest the ring gear 145 but permits free rotation when the transmission is in reverse. By this means a reverse rotation of cage 142 and driven shaft 105b with suitable torque is obtained, the drive being through sun gear 140a, pinion gears 141x, pinion gears 141y, and stationary sun gear 140b. This sliding collar 144a is also of service when using the motor in first or second speeds, as a braking means; as for example in descending a steep hill. Under these conditions, the coasting of the vehicle tends to turn the driven shaft 105b and cage 142 forward faster than the motor shaft and the sun gear 140a. Thereby it exerts forward thrust on the ring gear 145, which is not held against forward movement by ratchet 143 and can therefore revolve freewheeling and fail to cause motor-brake action. To hold the ring 145 stationary against both forward and reverse thrust, as when motor-braking, the operator may draw the lever 147 and with it ring 144d and lever 144b to the rear or right, thereby shoving the sliding collar 144a to the extreme forward or left, so that the teeth of the ratchet member 143 are engaged by the sliding collar to the casing 18 and thereby the ring gear 145 is held stationary.

When in automatic forward drive, the lever 147 is in an intermediate position, so that the lever 144b, fork 144c and sliding collar 144a are also intermediate between reverse and coasting or motor-braking position. Under these circumstances, the slide collar 144a is moved forward sufficiently to engage the teeth of the ring 144, but not those of the ratchet member 143. While so engaged, the ring gear 145 is held against reverse thrust by the ratchet 143 in first and second speed, and serves as a stationary reaction member for the multiplication of torque, but is automatically released by the ratchet 143 in third and fourth speeds.

It will be seen that by an interchange for example, of the larger gear 140b with the smaller gear 140a, the drum 191 may be used for reverse, and drum 195 keyed to the shaft 109 may be used for fourth speed forward, appropriate valve closure effecting the respective clutching actions. It will be understood generally that the representation in Fig. 9, being illustrative of the various arrangements in which the feature of combining differential pinions with a planetary train to attain desired speeds other than those available in the planetary train alone, is contemplated.

Other modes of applying the principle of the invention may be employed, change being made as regards the details described, provided the features stated in any of the following claims, or the equivalent of such, be employed.

I therefore particularly point out and distinctly claim as my invention:

1. In variable gearing mechanism, a drive shaft, a driven shaft, fluid-gearing means and epicyclic gearing therebetween including elements selectively restrainable, and means including at least a part of said fluid-gearing for selectively restraining such elements of the epicyclic gearing for under-drive or over-drive speeds of the driven shaft relative to the drive shaft speed.

2. In variable gearing mechanism, shafts to be connected, said shafts including a drive shaft, a driven shaft; epicyclic gearing between said shafts, including selectively lockable gear elements; two pumps, one connected to one of said elements and the other connected to another of said elements; and means for locking a selected part of said epicyclic elements for under-drive and over-drive of said driven shaft relative to said drive shaft.

3. In variable gearing mechanism, a drive shaft, a driven shaft, fluid-gearing means and epicyclic gearing therebetween including elements selectively restrainable, valve-operating means for controlling the fluid-gearing means, and means for restraining a selected portion of said restrainable elements for over-drive speed of the driven shaft relative to the drive shaft speed.

4. In variable gearing mechanism, shafts to be connected, said shafts including a drive shaft, a driven shaft; epicyclic gearing elements therebetween, including elements variably restrainable for speeds under-drive or over-drive relative to the drive shaft speed; two pumps, one connected to one of said elements and the other connected to another of said elements; and fluid stoppage means for selectively controlling the epicyclic gearing for under-drive, direct drive and over-drive of said driven shaft relative to said drive shaft.

5. In variable gearing mechanism, shafts to be connected, said shafts including a drive shaft, a driven shaft; epicyclic gearing elements therebetween, including idlers having plural sets of teeth, plural sun gears, and selectively lockable gear elements; two pumps, one connected to one of said epicyclic elements and the other connected to another of said elements; and means for selectively controlling the epicyclic gearing.

6. In variable gearing mechanism, shafts to be connected, said shafts including a drive shaft, fluid-pump means in part at least connected to one of said shafts, a timing valve for said fluid-pump means, automatic means and volitionally operable means for controllng said valve, epicyclic gearing elements between said shafts, and mechanical means and fluid stoppage means for locking a selected part of the epicyclic gearing elements.

7. In variable gearing mechanism, shafts to be connected, said shafts including a drive shaft, fluid-pump means in part at least connected to one of said shafts, a timing valve for said fluid-pump means, centrifugal means and a volitionally-operated slide collar for controlling said valve, epicyclic gearing elements between said shafts, and means for locking a selected part of the epicyclic gearing elements.

8. In variable gearing mechanism, shafts to be connected, said shafts including a drive shaft, fluid-pump means in part at least connected to one of said shafts, an oscillably regulable sleeve valve for said fluid-pump means, centrifugal means and a volitionally-operated slide collar for controlling said sleeve valve, epicyclic gearing elements between said shafts, and means for locking a selected part of the epicyclic gearing elements.

9. In variable gearing mechanism, shafts to be connected, said shafts including a drive shaft, fluid-pump means in part at least connected to one of said shafts, an oscillably regulable plug valve for said fluid-pump means, centrifugal means and a volitionally-operated slide collar for controlling said plug valve, epyclic gearing elements between said shafts, and means for locking a selected part of the epicyclic gearing elements.

10. In variable gearing mechanism, shafts to be connected, said shafts including a drive shaft, a set of pump pistons connected to a driven shaft, another set of pistons of a different size connected to another shaft, epicyclic gearing elements between said shafts; means including at least a part of said pistons to produce under-drive of said driven shaft relative to said drive shaft; and means for selectively restraining a portion of said epicyclic gearing for over-drive of the driven shaft relative to the drive shaft.

11. In variable gearing mechanism, shafts to be connected, said shafts including a drive shaft, a driven shaft; epicyclic gearing elements between said shafts; fluid-pump means in two sets, one connected to one of said elements and the other connected to another of said elements; valve means for preventing movement of said pump means; and means for selectively locking parts of the epicyclic elements to produce reverse drive and four torque ratios of forward drive of said driven shaft relative to said drive shaft.

12. In variable gearing mechanism, a drive shaft, a driven shaft; epicyclic gearing therebetween, including means providing a variable intermediate speed without disturbance of dynamic balance, and gearing elements selectively controllable for under-drive or over-drive of the driven shaft; two pumps, one connected to one of said elements and the other connected to another of said elements; and means for selectively controlling the epicyclic gearing for under-drive or over-drive of said driven shaft relative to said drive shaft.

13. In variable gearing mechanism, shafts to be connected, said shafts including a drive shaft, fluid-pump means in part at least connected to one of said shafts, epicyclic gearing elements also between said shafts, an oscillably regulable sleeve valve for controlling said pump means, an oscillably regulable sleeve valve element seated about said valve for controlling fluid thereto, and means for controlling the epicyclic gearing.

14. In variable gearing mechanism, a drive shaft, a driven shaft, fluid-gearing means and epicyclic gearing therebetween, a fluid-sump in said fluid-gearing means, and means for returning externally escaping fluid, including a bore having its receiving end in a central zone externally of said sump and extending in an outward direction into communication with the sump to forward fluid by centrifugal force but retaining fluid when not in motion.

15. In variable gearing mechanism, a drive shaft, a driven shaft, fluid-gearing means and epicyclic gearing therebetween, a stationary housing about said epicyclic gearing, a ratchet effective one way on said epicyclic gearing, and a slide collar and an external operating-lever therefor for optionally locking said ratchet to said stationary housing.

16. In variable gearing mechanism, a housing, a drive shaft, a driven shaft, fluid-gearing means and epicyclic gearing therebetween, a stationary housing about said epicyclic gearing, a ratchet in two parts, one being carried by the epicyclic gearing and a slide collar for locking either or both parts of the ratchet to said stationary housing.

17. In variable gearing mechanism, shafts to be connected, said shafts including a drive shaft, fluid-pump means in part at least connected to one of said shafts, epicyclic gearing elements between said shafts having idlers with three sets of teeth, respective sun gears meshed with such teeth and a ring gear about one thereof, and means for locking a selected sun gear to standstill.

18. In variable gearing mechanism, a drive shaft, a driven shaft, fluid-pump means between said shafts, valve-means for controlling same, a hollow shaft, another pump-means between said drive shaft and said hollow shaft, valve-means movable axial-wise with respect to said hollow shaft for controlling the same, epicyclic gearing means between said hollow shaft and said driven shaft, means to operate said valve means for locking a selected part of said epicyclic means, and optionally controllable ratchet-means releasing in one direction and engaging in the other to hold part of said epicyclic means stationary.

19. In variable gearing mechanism, a drive shaft, a driven shaft, fluid piston pump means between said shafts, a hollow shaft, another piston pump-means between said drive shaft and said hollow shaft, the pistons of both said pump means being substantially in a common plane, a fluid circuit connecting the two said pump means, valve-means including timed intake and exhaust means for controlling one pump-means as an impelled unit, epicyclic gearing means between said hollow shaft and said driven shaft, and manual and centrifugal means to operate said valve means for locking a selected part of said epicyclic means.

20. In variable gearing mechanism, a drive shaft, a driven shaft, fluid-pump means between said shafts, valve-means for controlling same, a hollow shaft, another pump-means between said drive shaft and said hollow shaft, valve-means for controlling the same, epicyclic gearing means between said hollow shaft and said driven shaft and including idlers having plural sets of teeth and plural sun gears to secure under-drive or over-drive of the driven shaft, and means to operate said valve means for locking a selected part of said epicyclic means.

21. In variable gearing mechanism, a drive shaft, a driven shaft, fluid-pump means between said shafts, a hollow shaft, another pump-means between said drive shaft and said hollow shaft, epicyclic gearing means between said hollow shaft and said driven shaft and including idlers having plural sets of teeth and plural sun gears to secure under-drive or over-drive of the driven shaft, manual and centrifugal means to operate said valve means for locking a selected part of said epicyclic means, and valves and valve control means for controlling flow in said pump means.

22. In variable gearing mechanism, a drive shaft, a driven shaft, fluid-pump means between said shafts, valve-means for controlling same, a hollow shaft, another pump-means between said drive shaft and said hollow shaft, valve-means for controlling the same, epicyclic gearing means on said hollow shaft and said driven shaft and including sun gears and idlers having plural sets of teeth, optionally actuable mechanical braking means for each of said sun gears, and means to operate said valve-means for locking a selected part of said epicyclic means.

23. In variable gearing mechanism, a drive shaft, a driven shaft, a drive fluid-pump and a driven fluid-pump connected between said shafts, epicyclic gearing connected between said shafts having plural sets of pinions, and ratchet-means including an external operating lever and a slide locking collar to hold part of said epicyclic gearing stationary.

24. In variable gearing mechanism, a drive shaft, a driven shaft and a coaxial hollow driven shaft, respective sets of pump means between said drive and said driven shafts, valve-means for controlling the same, epicyclic means on said driven shafts including plural sun gears and idlers having plural sets of teeth, means to actuate said valve-means for operating a selected part of said epicyclic means from the drive shaft by stoppage of fluid circulation, and selective mechanical means for optionally holding stationary selected elements of said epicyclic means for under-drive, direct drive or over-drive of said driven shafts relative to said drive shaft.

25. In variable gearing mechanism, a drive shaft, a driven shaft and a coaxial hollow driven shaft, respective sets of pump means between said drive and said driven shafts having cylinder elements radially interspaced, valve-means for controlling the same, epicyclic means on said driven shafts including plural sun gears and idlers having plural sets of teeth, means to actuate said valve-means for operating a selected part of said epicyclic means from the drive shaft by stoppage of fluid circulation, and selective mechanical means for optionally holding stationary selected elements of said epicyclic means for under-drive, direct drive or over-drive of said driven shafts relative to said drive shaft.

26. In variable gearing mechanism, a drive shaft, a driven shaft and a coaxial hollow driven shaft, respective sets of pump means between said drive and said driven shafts having piston-elements in a common plane, valve-means for controlling the same, epicyclic means on said driven shafts including plural sun gears and idlers having plural sets of teeth, means to actuate said valve-means for operating a selected part of said epicyclic means from the drive shaft by stoppage of fluid circulation, and selective mechanical means for optionally holding stationary selected elements of said epicyclic means for under-drive, direct drive or over-drive of said driven shafts relative to said drive shaft.

27. In mechanism of the character described, a drive shaft, a driven shaft, means between said shafts including toothed gear and fluid-pump means, the latter comprising sets of pump pistons connected to different shafts, an annular distributing valve for controlling said pistons, said valve having a tapering seat, and means for easing said valve on its seat.

28. In mechanism of the character described, a drive shaft, a driven shaft, means between said shafts including toothed gear and fluid-pump means, the latter comprising a fluid pump means, another pump means capable of receiving the discharge therefrom, an annular distributing valve for controlling fluid-flow relative to the pump means, said valve having a tapering seat, and resilient means urging the valve against its seat.

29. In mechanism of the character described, a drive shaft, a driven shaft, means between said shafts including toothed gear and fluid-pump means, the latter comprising sets of fluid pump pistons connected to different shafts, eccentrics for operating respective sets of pistons and including oscillably regulable eccentric means, and weight means for counterbalancing the oscillably regulable eccentric means.

30. In mechanism of the character described, a drive shaft, a driven shaft, means between said shafts including toothed gear and fluid-pump means, another controllable pump means capable of receiving the discharge from the latter, one-way ratchet means for releasing at least a portion of said gear means, distributing valve means for said pump means, and means for controlling the output of said last-named pump means.

31. In mechanism of the character described, a drive shaft, a driven shaft, means between said shafts including toothed gear and fluid-pump means, the latter comprising a piston pump means, another controllable piston pump means to receive the discharge therefrom, and one-way ratchet means for releasing at least a portion of said gear means.

32. In mechanism of the character described, a drive shaft, a driven shaft, means between said shafts including toothed gear and fluid-pump means, the latter comprising two sets of reciprocating pump pistons, the pistons of each set being equi-distantly spaced radially from each other, a rotary body containing chambers for said pistons, each set of pistons being connected to a respective shaft, eccentrics interposed between the shafts and sets of pistons, one being adjustable, and valve means and conduits for connecting said sets of pistons, said valve means including an annular valve coaxial with said shafts and adjustable with said adjustable eccentric.

33. In mechanism of the character described, a drive shaft, a driven shaft, means between said shafts including toothed gear and fluid-pump means, the latter comprising two sets of reciprocating pump pistons, the pistons of each set being equi-distantly spaced radially from each other, a rotary body containing chambers for said pistons, each set of pistons being connected to a respective shaft, eccentrics interposed between the shafts and sets of pistons, one being adjustable, and valve means and conduits for connecting said sets of pistons, said valve means including an annular valve and another valve, means for controlling the other valve, said means including an annular member having peripheral teeth and centrifugal weights provided with teeth meshing therewith, and volitional control means for also adjusting said other valve.

WILLIAM E. LAWRENCE.